United States Patent
Wiggins et al.

(10) Patent No.: US 6,350,787 B1
(45) Date of Patent: Feb. 26, 2002

(54) DEFOAMERS FOR AQUEOUS SYSTEMS

(75) Inventors: Michael S. Wiggins, Lansdale; Ronald W. Broadbent, Horsham, both of PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/093,810

(22) Filed: Jun. 9, 1998

Related U.S. Application Data

(60) Provisional application No. 60/049,338, filed on Jun. 10, 1997.

(51) Int. Cl.$^7$ .............................. B01D 19/04; C08K 5/06; C08L 13/02
(52) U.S. Cl. ....................... 516/134; 516/126; 516/128; 516/129; 516/132; 524/377; 524/762; 568/618; 568/625
(58) Field of Search ................................. 516/134, 128, 516/126, 129, 132; 524/377, 376, 762; 568/579, 583, 587, 618, 619, 620, 622, 623, 624, 625

(56) References Cited

U.S. PATENT DOCUMENTS

| | | | | |
|---|---|---|---|---|
| 2,572,886 A | 10/1951 | DeGroote et al. | ........... | 568/606 |
| 3,623,988 A | 11/1971 | Weimer | ........... | 510/535 |
| 3,671,458 A | 6/1972 | Sherman et al. | ........... | 516/9 |
| 4,011,389 A | 3/1977 | Langdon | ........... | 516/76 |
| 4,077,894 A | 3/1978 | Langdon et al. | ........... | 252/76 |
| 4,077,895 A | 3/1978 | Langdon et al. | ........... | 516/134 |
| 4,098,713 A | 7/1978 | Jones | ........... | 510/351 |
| 4,375,565 A | 3/1983 | Greif et al. | ........... | 568/622 |
| 4,978,805 A | * 12/1990 | Baur et al. | ........... | 568/622 |
| 5,266,690 A | 11/1993 | McCurry, Jr. et al. | ..... | 536/18.6 |
| 5,370,816 A | 12/1994 | Balzer et al. | ............... | 510/535 |
| 5,573,707 A | 11/1996 | Cole et al. | ............ | 516/129 |
| 5,599,787 A | 2/1997 | Schmid et al. | ............. | 510/470 |
| 5,728,895 A | 3/1998 | Wiggins et al. | ............. | 568/601 |
| 5,827,453 A | 10/1998 | Gross et al. | ................ | 252/321 |

OTHER PUBLICATIONS

Grants Hackh's Chemical Dictionary, Fifth Edition (McGraw–Hill Book Co., NY, NY, Apr. 1990) p. 265,.*
Hawley's Condensed Chemical Dictionary, Eleventh Edition, (Van Nostrand Reinhold Company, NY, NY, copyright 1987) p. 569, Oct. 1989.*
Fessenden & Fessenden, Organic Chemistry, (Willard Grant Press, Boston, Ma Copyright 1979) pp. 165–167, 207 and 283, Aug. 1980.*
Ser. No. 08/923,868; filed: Sep. 4, 1997.
Ser. No. 09/095,677; filed: Jun. 10, 1998.

* cited by examiner

*Primary Examiner*—Daniel S. Metzhaser
(74) *Attorney, Agent, or Firm*—John E. Drach; Henry E. Millson, Jr.

(57) ABSTRACT

The products of the reaction of epichlorohydrin and compounds having the formula II $$R_3(EO)_n(PO)_mOH \qquad (II)$$

wherein $R_3$ is an alkyl, alkenyl or arenyl group having from 4 to 22 carbon atoms; a substituted alkyl or alkenyl group having from 4 to 22 carbon atoms wherein; n is a number from 0 to 50 and m is a number from 0 to 50; wherein the mole ratio of epichlorohydrin to (II) is from about 0.60/1 to about 2/1 are used in defoaming compositions for defoaming aqueous systems such as latex paints.

12 Claims, No Drawings

DEFOAMERS FOR AQUEOUS SYSTEMS

CROSS-REFERENCE TO RELATED APPLICATIONS:

This application claims the benefit of copending provisional application serial No. 60/049,338, filed on Jun. 10, 1997.

STATEMENT REGARDING FEDERALLY SPONSORED RESEARCH OR DEVELOPMENT:

Not Applicable

BACKGROUND OF THE INVENTION

Aqueous compositions such as polymer latexes and latex paints exhibit a tendency toward foaming because they contain surface active agents such as soaps, and synthetic detergents. In many instances, such compositions produce excessive foam and the user must use substances known as anti-foaming agents or defoamers. Some defoamers such as silicones tend to interfere with the function of these compositions in that they interfere with the basic function of a product such as a water-based paint after it has been deposited on a surface. Defoamers comprised of polyethylene wax dispersed in paraffin oil have been in aqueous systems such as latexes and latex paints. These types of defoamers suffer from a number of deficiencies such as a lack of persistence in that their defoaming effect is relatively short-lived and a tendency to reduce the scrub resistance of paints in which they have been used.

SUMMARY OF THE INVENTION

The surprising discovery has been made that the products of the reaction of epichlorohydrin and compounds having the formula II $$R_3(EO)_n(PO)_m\text{-OH} \qquad (II)$$

wherein $R_3$ is an alkyl, alkenyl or arenyl group having from 4 to 22 carbon atoms; a substituted alkyl or alkenyl group having from 4 to 22 carbon atoms wherein; n is a number from 0 to 50 and m is a number from 0 to 50; wherein the mole ratio of epichlorohydrin to (II) is from about 0.60/1 to about 2/1 are extremely efficient defoamers for aqueous systems such as latexes and latex paints. These reaction products are added to the aqueous systems in an amount sufficient to reduce or eliminate foam.

Another aspect of the invention pertains to a multi-component defoamer for aqueous systems such as latexes and latex paints. The multi-component defoamer according to the invention is a composition comprised of a hydrophobic solid, one or more reaction products according to the invention dispersed and an inert water-insoluble liquid carrier such as a paraffin oil. These defoamers exhibit enhanced persistence and impart good scrub resistance of paints into which they have been added.

BRIEF DESCRIPTION OF THE SEVERAL VIEWS OF THE DRAWING

Not Applicable

DETAILED DESCRIPTION OF THE INVENTION

The term defoamer as used herein includes the reduction and/or prevention of foam or foaming in aqueous systems. An aqueous system is any aqueous medium such as an aqueous solution, dispersion or emulsion.

The reaction products as described herein below can be used as defoamers for aqueous systems in several ways. One way is by adding the reaction products themselves to an aqueous system such as a latex or a latex paint in an amount effective to eliminate or decrease the foam generated as a result of some type of mechanical action such as mixing, pouring, applying to a surface such as by a brush or a roller, and/or shaking. The amount required to eliminate and/or decrease foam is defined as a defoaming effective amount and will vary from one instance to another depending upon the nature of the aqueous system and the defoaming effect desired. A defoaming effective amount will be readily determinable by one of ordinary skill in the art will typically vary from about 0.001% to about 10.0%, preferably from about 0.1% to about 3.0% by weight.

Another way is by adding to an aqueous system a mixture comprised of one or more reaction products according to the invention and a carrier oil base. The carrier oil base useful in the process according to the invention is any waterinsoluble liquid that will dissolve and/or disperse one or more reaction products according to the invention. Such carrier bases include but are not limited to paraffinic and naphthenic oils, tall oil fatty acids and ethoxylated tall oil fatty acids, fatty alcohols and ethoxylated fatty alcohols, liquid polypropylene oxide, liquid polyethylene oxide, liquid poly (ethylene oxide-propylene oxide) or any combination thereof. The relative amount of reaction products according to the invention in the mixture with the carrier oil base will typically range from about 1% to about 50% by weight and will preferably be from about 5% to about 15% by weight. A defoaming effective amount of such a mixture will be readily determinable by one of ordinary skill in the art and will typically vary from about 0.01% by weight to about 10%, preferably from about 0.1 to about 1.0% by weight.

Yet another way of using the reaction products according to the invention in defoaming applications is as part of a multi-component defoamer composition comprised of a hydrophobic solid and one or more reaction products according to the invention dispersed in an inert, water insoluble carrier fluid. The hydrophobic solid is any solid that is insoluble in the carrier fluid and having a particle size of less than about 70 microns. Examples of the hydrophobic solid include, but are not limited to, waxes such as polyethylene wax, ethylene-bis-stearamide; inorganic powders such as silica. Mixtures of various types of hydrophobic solids can also be used. The carrier fluid useful in the processes and compositions according to the invention is any water-insoluble liquid that will disperse the paraffin oil, naphthenic oils, liquid hydrocarbons, tall oil fatty acids and ethoxylated tall oil fatty acids, fatty alcohols and ethoxylated fatty alcohols, liquid polypropylene oxide, liquid polyethylene oxide, liquid poly(ethylene oxidepropylene oxide), or any combination thereof. A defoaming effective amount of such a multi-component defoamer composition will be readily determinable by one of ordinary skill in the art and will typically vary from about 0.1% by weight to about 10%, preferably from about 0.1 to about 1.0% by weight.

This embodiment of the defoamer according to the invention can be made by mixing one or more reaction products according to the invention, a hydrophobic solid and a water-insoluble liquid carrier capable of dissolving or dispersing the hydrophobic solid and the reaction product at a temperature sufficient to melt the hydrophobic solid. Preferably, the above process can be modified by using a portion of the liquid carrier in the mixing step followed by the addition of the warm mixture to a second portion of liquid carrier at room temperature.

The reaction products according to the invention are the products of the reaction of epichlorohydrin and compounds having the formula II

$$R_3(EO)_n(PO)_mOH \quad (II)$$

wherein $R_3$ is a substituted or unsubstituted, saturated or unsaturated aliphatic moiety having from 4 to 22 carbon atoms; a substituted alkyl or alkenyl group having from 4 to 22 carbon atoms wherein; n is a number from 0 to 50 and m is a number from 0 to 50; and epichlorohydrin wherein the mole ratio of epichlorohydrin to (II) is from about 0.60/1 to about 2/1 and preferably from about 0.80/1 to about 211. These products are described in copending application Ser. No. 08/783,224, filed on Jan. 14, 1997 now U.S. Pat. No. 5,827,455.

In regard to the alkoxylates of formula II, $R_3$ can be any substituted or unsubstituted, saturated or unsaturated aliphatic moiety having from 4 to 22 carbon atoms. Thus $R_3$ can be a linear or branched alkyl group, a linear or branched alkenyl or alkynyl group, a saturated carbocyclic moiety, an unsaturated carbocyclic moiety having one or more multiple bonds, a saturated heterocyclic moiety, an unsaturated heterocyclic moiety having one or more multiple bonds, a substituted linear or branched alkyl group, a substituted linear or branched alkenyl or alkynyl group, a substituted saturated carbocyclic moiety, a substituted unsaturated carbocydic moiety having one or more multiple bonds, a substituted saturated heterocyclic moiety, a substituted unsaturated heterocyclic moiety having one or more multiple bonds. Examples of the above include but are not limited to an alkyl group having from 4 to 22 carbon atoms, an alkenyl group having from 4 to 22 carbon atoms, an alkynyl group having from 4 to 22 carbon atoms. $R_3$ can also be an arenyl group. Arenyl groups are alkyl-substituted aromatic radicals having a free valence at an alkyl carbon atom such as a benzylic group. The preferred value of $R_3$ is an alkyl group having from 4 to 12 carbon atoms and most preferably an alkyl group having from 8 to 10 carbon atoms. The degree of ethoxylation is preferably from 2 to about 50 with the most preferred being from about 4 to about 50 while the degree of propoxylation can vary from 0 to 50. The degree of propoxylation will be determined by the desired degree of water solubility or miscibility. The water solubility or miscibility will ultimately be determined by such factors as the number of carbon atoms in $R_3$, the relative amounts EO to PO and the effect of PO on the biodegradability of the final defoamer. The water solubility or miscibility of a defoamer according to the invention and the interrelationships between the number of carbon atoms in $R_3$, the relative amounts EO and PO and the biodegradability of the final product will be readily determinable by one of ordinary skill in the art.

The method according to the invention can be used to control foam generated by any type of aqueous system having a surface tension below that of water such as aqueous-based personal care products as shampoos, facial cleaners, liquid hand soaps, and the like, and polymer latexes and latex paints. The defoaming compositions and methods are especially useful for controlling foam in polymer latexes and latex paints.

The following examples are meant to illustrate but not to limit the invention.

EXAMPLE 1

About 150 grams of decyl alcohol ethoxylated with an average of 4 moles of ethylene oxide (0.45 OH equivalents) were mixed with 385 grams of toluene and 54 grams of 50% aq. NaOH (0.675 equivalents). The water was removed by azeotropic distillation and when a moisture level of less than 0.8% was reached, about 46 grams (0.51 equivalents) of epichlorohydrin were slowly added. This mixture was allowed to react at 100–110° C. for 24 hours. An aliquot of this mixture was removed and filtered to remove the NaCI and vacuum stripped to remove the toluene to give an amber, easily pourable liquid product that was dispersible in water. When about 1 gram of this liquid was shaken with 1 gram of decyl alcohol ethoxylated with an average of 4 moles of ethylene oxide in 50 grams of DI water, very little foam was observed. When 1 gram of decyl alcohol ethoxylated with an average of 4 moles of ethylene oxide in 50 grams of DI water was shaken, a very large amount of foam was observed.

EXAMPLE 2

About 51 grams of butanol ethoxylated with an average of 2 moles of ethylene oxide (0.32 OH equivalents) were mixed with 120 grams of toluene and 25 grams of 50% aq. NaOH (0.32 equivalents). The water was removed by azeotropic distillation and when a moisture level of less than 0.8% was reached, about 46 grams (0.24 equivalents) of epichlorohydrin were slowly added. This mixture was allowed to react at 100–110° C. for 24 hours. An aliquot of this mixture was removed and filtered to remove the NaCI and vacuum stripped to remove the toluene to give an amber, easily pourable liquid product that was insoluble in water. When about 1 gram of this liquid was shaken with 1 gram of decyl alcohol ethoxylated with an average of 4 moles of ethylene oxide in 50 grams of DI water, very little foam was observed.

EXAMPLE 3

About 200.0 gm (0.654 hydroxyl equivs.) of octyl alcohol ethoxylated with an average of 4 moles of ethylene oxide was mixed with 400 gm toluene and 78.4 gm (0.98 equivs.) of 50% NaOH. Water was removed by azeotropic distillation until the level was below 0.8%. The mixture was cooled to 80° C. and 67.2 gm (0.72 moles) of epichlorohydrin was added over 45 mins. The mixture was stirred for 24 hrs at 110° C. until the epoxy titration showed no epoxide left. The material was cooled, filtered and the toluene was removed by vacuum distillation leaving a dark brown low viscosity liquid.

EXAMPLE 4

To a 1000 ml flask, 686 gms (2.0 OH equivs) of TRY-COL® 5950 (Decylalcohol +4 moles EO) was added. Material was warmed to 70°C. At this time 211 gms (2.6 equiv) of 50% aqueous sodium hydroxide was added slowly over 2 hrs by drop from an addition funnel while pulling full vacuum, heating to 140° C., and distilling off water. After approx., 5 hrs, all the NaOH was in and no more water was distilling off, the reaction was cooled to 70° C. An addition funnel containing 208 gms (2.2 moles) of epichlorohydrin was attached and allowed to drip in over 1.5 hrs maintaining the exotherm below 110° C. After the epichlorohydrin had been added, the temperature was raised to 120° C. until the oxirane titration indicated all the epichlorohydrin had reacted (approx. 12 hrs). At this point the salt was removed via water washing, centrifugation, filtration, Electro Dialysis or any combination of these leaving a dark amber liquid. The material can be lightened from a Gardner 14 to a Gardner 5 or lower with peroxide or Magnesol.

EXAMPLE 5

The procedure of Example 4 was repeated except that sodium hydroxide was replaced with sodium methoxide and methanol was distilled off.

EXAMPLE 6

To a 1000 ml flask, 686 gms (2.0 OH equivs) of TRYCOL® 5950 was added, heated to 80° C. and dried under vacuum. Then 208 gms (2.2 moles) of epichlorohydrin added. A total of 4 gms of boron trifluoride etherate was added in 4–1 gm parts, each after the previous exotherm subsides and an oxirane titration indicates there was still some unreacted oxirane. When no oxirane remains, 211 gms (2.6 equivs) of 50% NaOH was added over 2 hrs by addition funnel, under full vacuum, while heating to 140° C. and distilling off water. After no more water was being distilled, the material was cooled. At this point the salt was removed via water wash, centrifugation, filtration or any combination of these leaving a clear dark amber liquid. This material can be lightened with peroxide or Magnesol or any other known method.

EXAMPLE 7

About 4 grams of the reaction product of epichlorohydrin and $C_{10}H_{21}O(EO)_8OH$ (1.1/1.0 mole respectively prepared according to the method of Examples 4–6 above) was stirred with about 7 grams of A–C 629 polyethylene wax, a trademark product of Allied Signal having a mettler drop point of 101° C. (ASTM D3954), a hardness dmm (ASTM D-5) of 5.5, density g/cc of 0.93 and an acid no. mg KOH/gm) in about 45 grams of 100–105 second paraffin oil (Saybolt–100F) grade and heated to 105° C. The heated dispersion was then mixed with about 44 grams of room temperature paraffin oil with agitation. The relative performance of the defoamer prepared according to this Example is given in the table below.

TABLE 1

| PAINT[1] | DEFOAMER[2] | CONC (WT. %) | % AIR INIT/HEAT AGED[3] | BUBBLE BREAK INIT/HEAT AGED[4] |
|---|---|---|---|---|
| A | COLLOIDS ® 640/643 | 0.53 | 0.3/0 | 5/2 |
| A | EXAMPLE 7 | 0.50 | 1.3/1.6 | 13/18 |
| B | COLLOIDS ® 643 | 0.55 | 1.6/4.4 | 127/>300 |
| B | EXAMPLE 7 | 0.50 | 1.5/0.9 | 10/>300 |

[1]A is a paint based on a latex RHOPLEX ® HG-95, a trademark product of Rohm & Haas, Co. B is a paint based on UCAR ® 379 vinyl-acrylic latex, a trademark product of Union Carbide Corp.
[2]COLLOIDS ® 640/643 is a combination of a hydrophobic silica- ethylene bis-stearamide defoamer which is a trademark product of Rhone-Poulenc. COLLOIDS ® 643 is an ethylene bis-stearamide defoamer which is a trademark product of Rhone-Poulenc.
[3]See Example 8
[4]See Example 8

EXAMPLE 8

HEAT AGING

Duplicate ½ pint cans are prepared (as in Test A, steps 1 and 2 followed by 5 minute stir-in of defoamer using a laboratory stirrer) for those defoamers which appear promising based on initial results. These cans are placed in an oven at 120° F.(49° C). After two weeks at 120° F., the samples are evaluated via tests A, B and C to determine the effect of prolonged storage of the paint/defoamer system.

A. DEFOAMER ACTIVITY TEST—RED DEVIL SHAKER METHOD MATERIAL & EQUIPMENT

Red Devil Shaker (Model 511 -X)
½ pint paint cans
Paint gravity cup (weight per gallon cup)
Balance (500 gm. capacity min., accurate to 0.01 gm)
Test medium—standard batch of defoamer-free paint (also free of entrained air)
Defoamer reference "standard"
Defoamer to be evaluated PROCEDURE
1. Weigh 125 cc sample of test paint into ½ pint (250 cc) paint can.
2. Add defoamer being evaluated at a level of 0.5% by weight based on weight of paint.
3. Seal can and place on outer-most edge of Red Devil Paint Shaker Clamp (farthest from axis of rotation) so that maximum arc is achieved. NOTE: Cans must be placed in identical location on clamp for each test.
4. Shake for 5 minutes. Immediately after shaking, determine the weight/gallon of the shaker paint sample.
5. The decrease in density compared with that of the unshaken control paint sample is regarded as the amount of foam generated.

$$\% \text{ AIR ENTRAINED} = \frac{\text{wt./gal. (unshaken control)} - \text{wt/gal (test sample with defoamer)}}{\text{wt. gal. (unshaken control)}}$$

NOTE:
1. A shaken blank (standard paint without defoamer) should be run for each batch of standard test paint to determine the "foaminess" of the test medium and to establish the general magnitude of defoamer activity.
2. When comparing a sample of a given defoamer with a "standard", the standard should be re-run side by side with the test sample each time. It should be noted that depending on the test medium being used, variations of several percent entrained air between acceptable defoamer samples are not unusual.

B. DEFOAMER ACTIVITY TEST—ROLLER APPLICATION MATERIAL & EQUIPMENT

3 "roller handle
3 "roller cover, ⅜" nap
roller pan
Sherwin Williams Test Paper
Shurline Brush & Roller Cleaner PROCEDURE
1. Pre-soak 3" roller cover in distilled water and then spin dry using 10 strokes on Shurline Brush & Roller Cleaner.
2. Pour entire contents of ½ pint paint cans used in Test A (Shaker Test) into roller pan and saturate ⅜' nap roller.
3. Apply paint to 12"×13" sheet of Sherwin Williams paper mounted in a vertical position. Roller application technique should be consistent from test to test.
4. Immediately upon completion of roll-out, observe rate of bubblebreak.
5. Examine dry roll-outs for cratering resulting from delayed bubblebreak. Roll-outs resulting from various defoamers as well as a blank may be rated relative to each other.

C. DEFOAMER COMPATIBILITY TESTS MATERIAL & EQUIPMENT

Leneta form 2C sealed opacity charts
Bird Perforated Vacuum Plate
Bird Film Applicator 6", to deposit 3 mil wet film PROCEDURE
1. Apply Leneta Opacity Chart to vacuum plate so that chart is held flat and firm against plate.
2. Pour contents of paint gravity cup (following each Shaker Test—Test A) onto Leneta Opacity Chart and drawdown using Bird Film Applicator to yield a 3 mil wet paint film.
3. Observe film for film irregularities such as fisheyes, orange-peel, crawling or other defoamer related defects.
4. If paint system is tinted, a "rub-up test" should be performed whereby a portion of the wet draw-down is rubbed with the finger in a circular motion until tacky or near dry. Any difference in color or intensity of the rubbed-up area compared with the surrounding film is indicative of pigment flocculation which may be affected by the defoamer.

What is claimed is:

1. A composition consisting essentially of (a) a product of the process which consisting essentially of reacting epichlorohydrin and a compound of the formula II $$R_3(EO)_n(PO)_m OH \qquad (II)$$

wherein $R_3$ is an organic group having from 4 to 22 carbon atoms selected from the group consisting of a linear or branched alkyl group, a linear or branched alkenyl or alkynyl group, a saturated carbocyclic moiety, an unsaturated carbocyclic moiety having one or more multiple bonds, a saturated heterocyclic moiety, an unsaturated heterocyclic moiety having one or more multiple bonds, a substituted linear or branched alkyl group, a substituted linear or branched alkenyl or alkynyl group, a substituted saturated carbocyclic moiety, a substituted unsaturated carbocyclic moiety having one or more multiple bonds, a substituted saturated heterocyclic moiety, a substituted unsaturated heterocyclic moiety having one or more multiple bonds, and a arenyl group; wherein EO is an ethylene oxide unit and PO is a propylene oxide unit; n is a number from 0 to 50 and m is a number from 0 to 50; wherein the mole ratio of epichlorohydrin to (II) is from about 0.60/1 to about 2/1; and (b) a water-insoluble liquid carrier capable of dissolving or dispersing component (a).

2. The composition of claim 1 wherein $R_3$ is an alkyl group having from 4 to 12 carbon atoms.

3. The composition of claim 1 wherein $R_3$ is an alkyl group having from 8 to 10 carbon atoms.

4. The composition of claim 1 wherein n is a number from about 2 to about 50.

5. The composition of claim 1 wherein n is a number from about 4 to about 50.

6. The composition of claim 1 wherein the mole ratio of epichlorohydrin to (II) is from about 0.80/1 to about 2/1.

7. The composition of claim 1 wherein $R_3$ is an alkyl group having from 4 to 12 carbon atoms and n is a number from about 2 to about 50.

8. The composition of claim 1 wherein $R_3$ is an alkyl group having from 8 to 10 carbon atoms and n is a number from about 4 to about 50.

9. The composition of claim 1 wherein the compound of the formula II is $C_{10}H_{21}O(EO)_8OH$ and the mole ratio of epichlorohydrin to (II) is 1.1/1.0.

10. The composition of claim 1 wherein the water-insoluble liquid carrier is selected from the group consisting of paraffin oil, naphthenic oils, liquid hydrocarbons, tall oil fatty acids and ethoxylated tall oil fatty acids, fatty alcohols and ethoxylated fatty alcohols, liquid polypropylene oxide, liquid polyethylene oxide, liquid poly(ethylene oxide-propylene oxide), and combinations thereof.

11. The composition of claim 10 wherein the water-insoluble liquid carrier is paraffin oil.

12. The composition of claim 1 wherein $R_3$ is an alkyl, alkenyl, alkynyl or arenyl group.

* * * * *